(12) United States Patent
Burma

(10) Patent No.: US 11,298,731 B2
(45) Date of Patent: Apr. 12, 2022

(54) AUGER CLEANED INACCESSIBLE FLOOR SYSTEM

(71) Applicant: Bristola, LLC, Waukee, IA (US)

(72) Inventor: Jared Burma, Waukee, IA (US)

(73) Assignee: Bristola, LLC, Waukee, IA (US)

( * ) Notice: Subject to any disclaimer, the term of this patent is extended or adjusted under 35 U.S.C. 154(b) by 0 days.

(21) Appl. No.: 16/783,629

(22) Filed: Feb. 6, 2020

(65) Prior Publication Data
US 2020/0261950 A1 Aug. 20, 2020

Related U.S. Application Data

(60) Provisional application No. 62/805,785, filed on Feb. 14, 2019.

(51) Int. Cl.
*B08B 9/38* (2006.01)
*C02F 3/28* (2006.01)

(52) U.S. Cl.
CPC .............. *B08B 9/38* (2013.01); *C02F 3/2866* (2013.01)

(58) Field of Classification Search
CPC ....... B08B 9/38; B08B 9/0933; C02F 3/2866; Y02W 30/40; A01K 1/01; A01K 1/0128; A01K 1/0132; A01K 1/0139
See application file for complete search history.

(56) References Cited

U.S. PATENT DOCUMENTS

| 2,672,970 A | 3/1954 | Klinzing |
| 3,685,493 A * | 8/1972 | Weiland, Jr. ......... A01K 1/0139 119/451 |
| 4,432,870 A | 2/1984 | Russell |
| 4,615,802 A | 10/1986 | Harbaugh |
| 4,683,067 A | 7/1987 | Aleman et al. |

(Continued)

FOREIGN PATENT DOCUMENTS

| CN | 108939627 A | 12/2018 |
| WO | 2016071640 A1 | 5/2016 |
| WO | 2016128684 A1 | 8/2016 |

OTHER PUBLICATIONS

International Search Report dated Jul. 31, 2020 for related application PCT/US20/31649, 2 pages.

(Continued)

*Primary Examiner* — Douglas Lee
(74) *Attorney, Agent, or Firm* — Christopher A. Proskey; BrownWinick Law Firm

(57) ABSTRACT

Auger cleaned inaccessible floor systems to maximize operational capacity of inaccessible floors. The auger cleaned inaccessible floor system includes a floor having at least one channel beneath the lowest point of the floor extending horizontally at least half the length of the longest dimension of the floor and adapted for receiving an auger cleaner, at least one gate complex that provides fluid communication between the channel and at least one box and further provides access to the floor for the auger cleaner, and at least one box to deliver the auger cleaner to the channel and adapted for equalizing pressure when the inaccessible floor is under water to deliver an auger cleaner for cleaning. Thus, the auger cleaned inaccessible floor system allows cleaning of the inaccessible floor while the inaccessible floor system is in operation increasing the yield from the inaccessible floor system.

8 Claims, 14 Drawing Sheets

(56) References Cited

U.S. PATENT DOCUMENTS

| | | | |
|---|---|---|---|
| 4,945,933 A | | 8/1990 | Krajicek et al. |
| 5,093,949 A | * | 3/1992 | Sloan .................. B08B 9/0933 134/22.1 |
| 5,642,745 A | * | 7/1997 | Landry .................. B08B 9/051 134/167 R |
| 7,615,155 B1 | * | 11/2009 | Hansen .................. C12M 33/14 210/603 |
| 2002/0046712 A1 | | 4/2002 | Tripp et al. |
| 2004/0050338 A1 | | 3/2004 | Ford |
| 2005/0125936 A1 | | 6/2005 | Spraakman |
| 2006/0243677 A1 | | 11/2006 | Sheahan |
| 2010/0173391 A1 | | 7/2010 | Dvorak |
| 2014/0190517 A1 | | 7/2014 | Fallon et al. |
| 2019/0166788 A1 | | 6/2019 | Xu |

OTHER PUBLICATIONS

Written Opinion dated Jul. 31, 2020 for related application PCT/US20/31649, 5 pages.

ISR/WO issued Jun. 10, 2020 for related application PCT/US20/16997, 7 pages.

Murcott, James & Morphy, Lee, Small Farm De-gritting and SIDOM Conditioning Digester, Nov. 2013, 41 pages.

AKC Crane Range Foldable Knuckle and Telescopic Boom Type, HS Marine, Feb. 13, 2019, 5 pages.

Hydraulic Hose and Cable Reels, Hansa-TMP, May 21, 2018, 2 pages.

FieldNET—The Most Integrated Solution for Water, Fertilizer & Chemigation Management, Lindsay Corporation, Feb. 9, 2018, 3 pages.

Underwater Linear Actuators, Ultra Motion, Apr. 28, 2018, 3 pages.

Solids Handling Submerisble, Hayward Gordon, Feb. 13, 2019, 4 pages.

Underwater Cable for Hydroelectric Applications, Northwire, Apr. 16, 2018, 2 pages.

YC Series Single Phase Underwater Electric Motor, Apr. 28, 2018, 3 pages.

* cited by examiner

AUGER CLEANED INACCESSIBLE FLOOR SYSTEM

This application claims the benefit of the filing date of U.S. Provisional Application Ser. No. 62/805,785, filed Feb. 14, 2019, entitled 'AUGER CLEANED INACCESSIBLE FLOOR SYSTEM,' the entire disclosure of which is hereby incorporated by reference for all purposes into the present disclosure.

BACKGROUND

Removal of waste material from floors that are inaccessible during operation (inaccessible floors) conventionally requires halting operations to remove the waste material. For example, a floor may be inaccessible due to coverage with liquid, such as the floor of an anaerobic digester tank or anaerobic lagoon. Alternatively, a floor may be inaccessible during operation due to the presence of animals, such as in hog barns or dairy barns.

For optimal performance waste accumulation on the inaccessible floor must be removed. Waste accumulates on an inaccessible floor under normal operating conditions. For example, with respect to inaccessible floors of anaerobic digester tanks or lagoons, the process of anaerobic digestion produces waste. During anaerobic digestion microorganisms (e.g. acetogenic bacteria, archaea) breakdown organic matter into biogas (e.g. methane, carbon dioxide) and solid and liquid digested material (e.g. waste) having elemental nutrients, such as nitrogen, phosphorus, and potassium. Biogas is used as a fuel for combustion and energy production. The waste may be further processed for other uses (e.g. fertilizer), may be recycled back into the digester, or may be discarded.

As anaerobic digestion is carried out in the closed system of an anaerobic digester tank or lagoon that is sealed from the presence of oxygen, the anaerobic digester tank or lagoon fills with waste. This leads to reduced volume for anaerobic digestion to take place, with volume for anaerobic digestion reducing continuously as anaerobic digestion continues. Eventually digester tanks and lagoons require cleaning to remove the waste to maximize volume for anaerobic digestion to take place and to maintain the health of the microorganisms carrying out anaerobic digestion.

Conventional methods for cleaning anaerobic digester tanks and lagoons typically require manual cleaning, whereby production is first shut down, and the anaerobic tank or lagoon is vented and drained. After venting and draining, manual cleaning requires that a human enter the tank or lagoon to assist raking digested contents toward a vacuum where they can be removed. This manual process is both time consuming and hazardous.

The manual process of cleaning a digester tank on average takes at least two weeks, with additional time required to re-seed the tank with microorganisms to restart anaerobic digestion. Not only does production cease all together during this cleaning period, but because cleaning requires shutting down the entire digester operation, digester tanks tend to be cleaned less frequently. Less frequent cleaning means that a digester tank operates at sub-optimal volume.

The manual process of cleaning a digester tank is hazardous for humans. Venting the tank requires releasing explosive and hazardous gasses that may be poisonous to humans (sulfuric acid and ammonia). Moreover, it is dangerous to put a human in a digester tank, as they encounter hazards in a confined space handling mechanical equipment.

In an alternative example, inaccessible floors that are covered with livestock accumulate waste from livestock. This waste accumulation leads to poor conditions for the livestock and unwanted odor. Conventional methods for cleaning inaccessible floors with livestock require either removing the livestock to remove waste, such as with a pressure washer, or manual cleaning around the livestock. Both of these methods are time consuming and require a large amount of manual labor.

It is therefore desirable to have inaccessible floors with a channel designed for waste to accumulate on the inaccessible floor. It is further desirable for a cleaning method and apparatus to not require shutting down operations to increase operational production. Finally, it is desirable to not require physical human entry onto the inaccessible floor during cleaning to reduce the risk of injury and death and to minimize manual expenditure of labor.

FIGURES

Figure 10A:
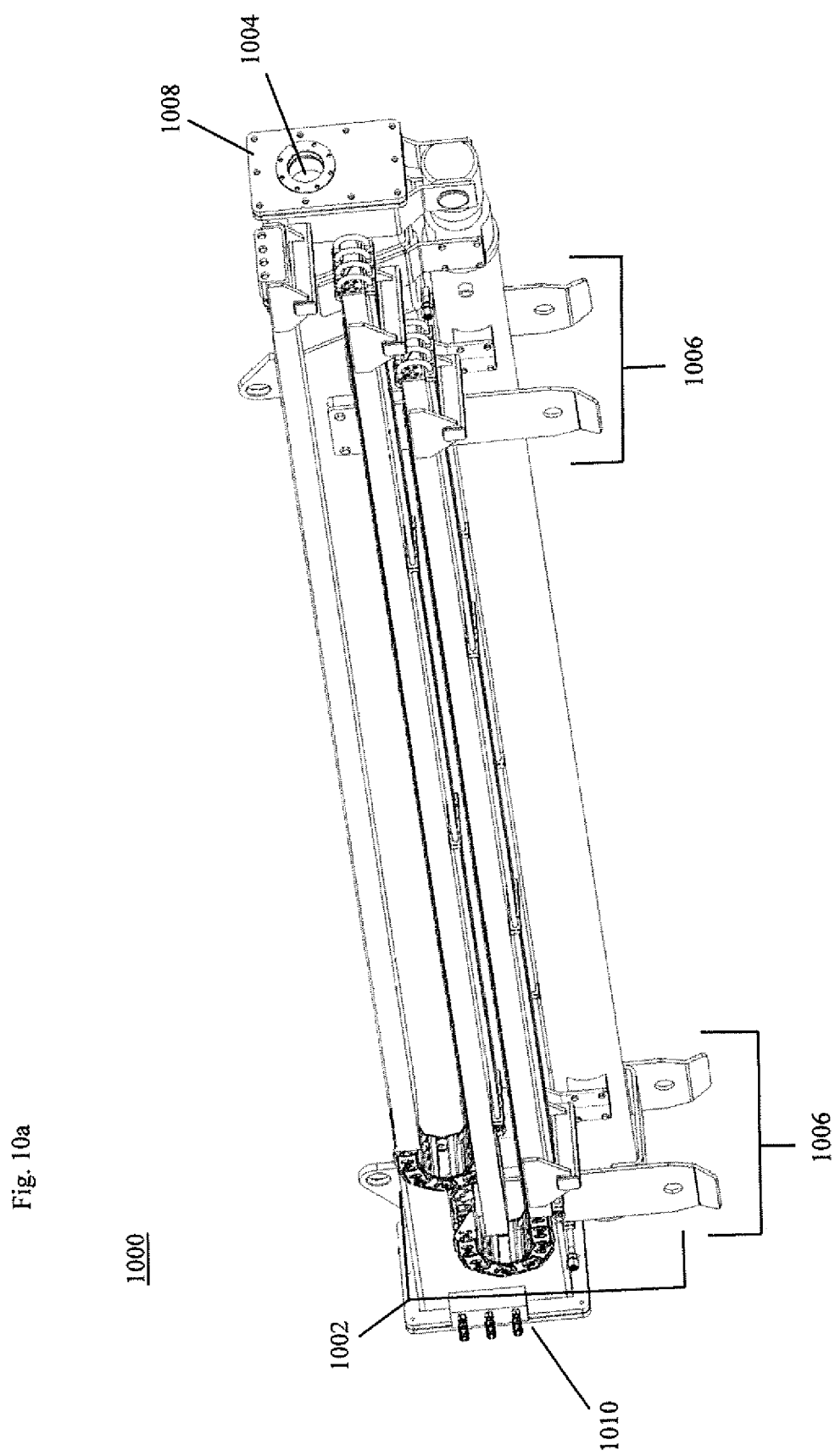

FIG. 10a. represents a boom in a retracted position.

Figure 10B:
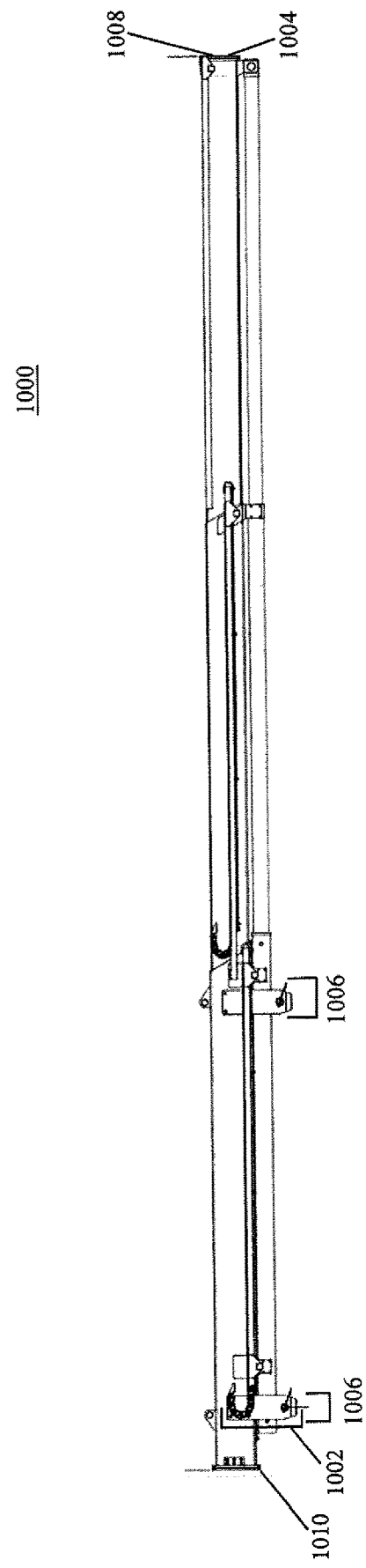

FIG. 10b. represents the boom in an extended position.

Figure 11:
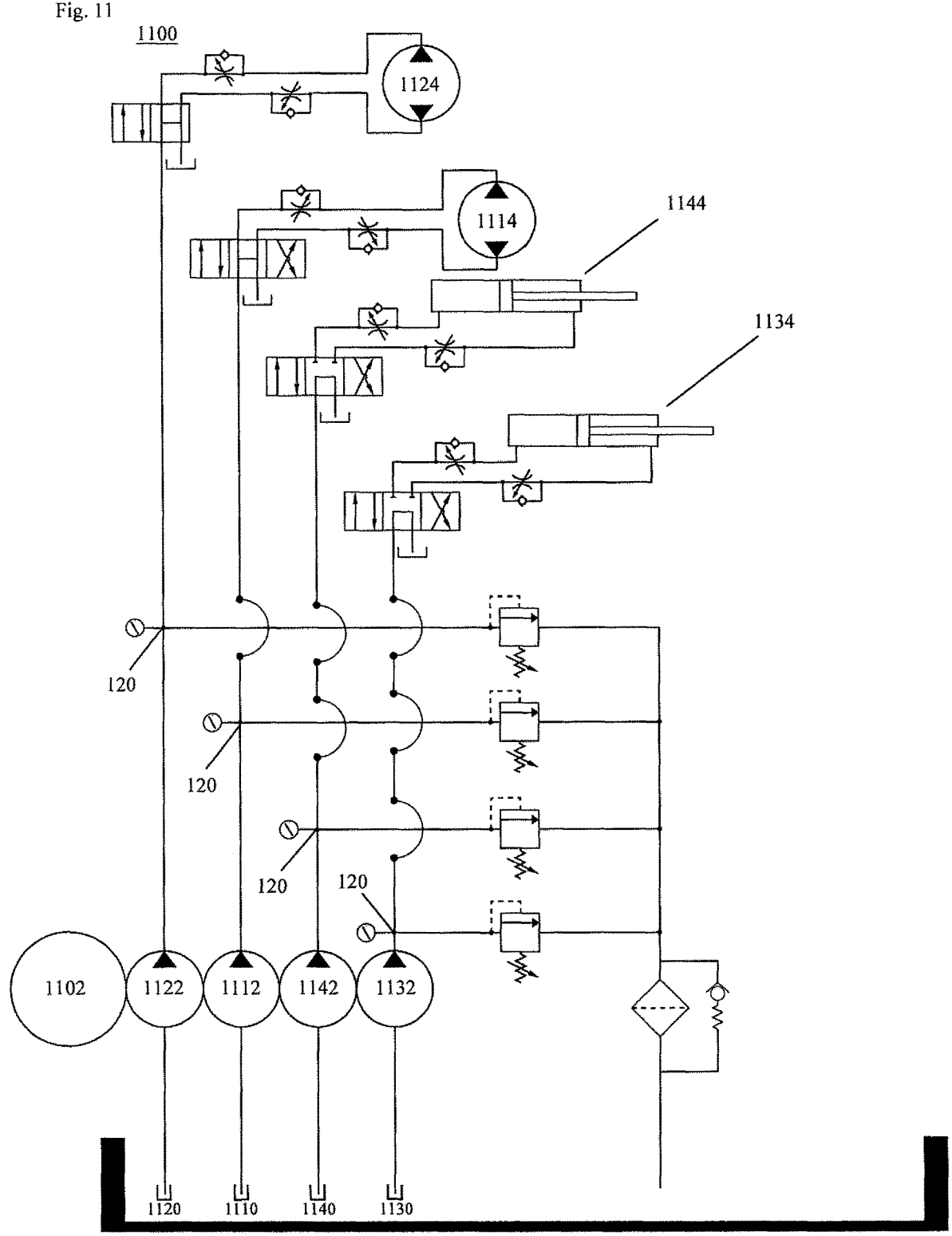

FIG. 11 represents an hydraulic circuit of the auger cleaned inaccessible floor system.

Figure 12A:
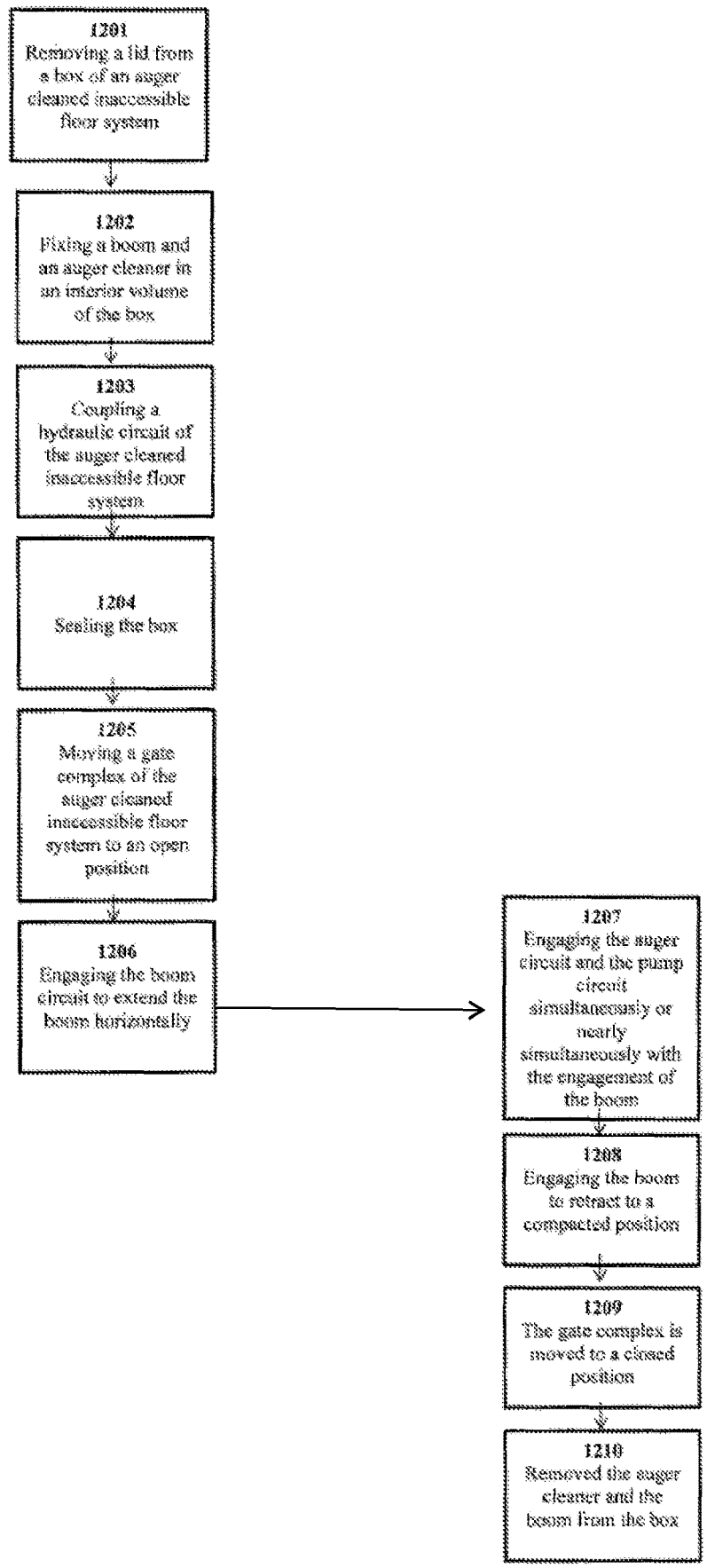

FIG. 12a. represents a method for cleaning the auger cleaned inaccessible floor system.

Figure 12B:
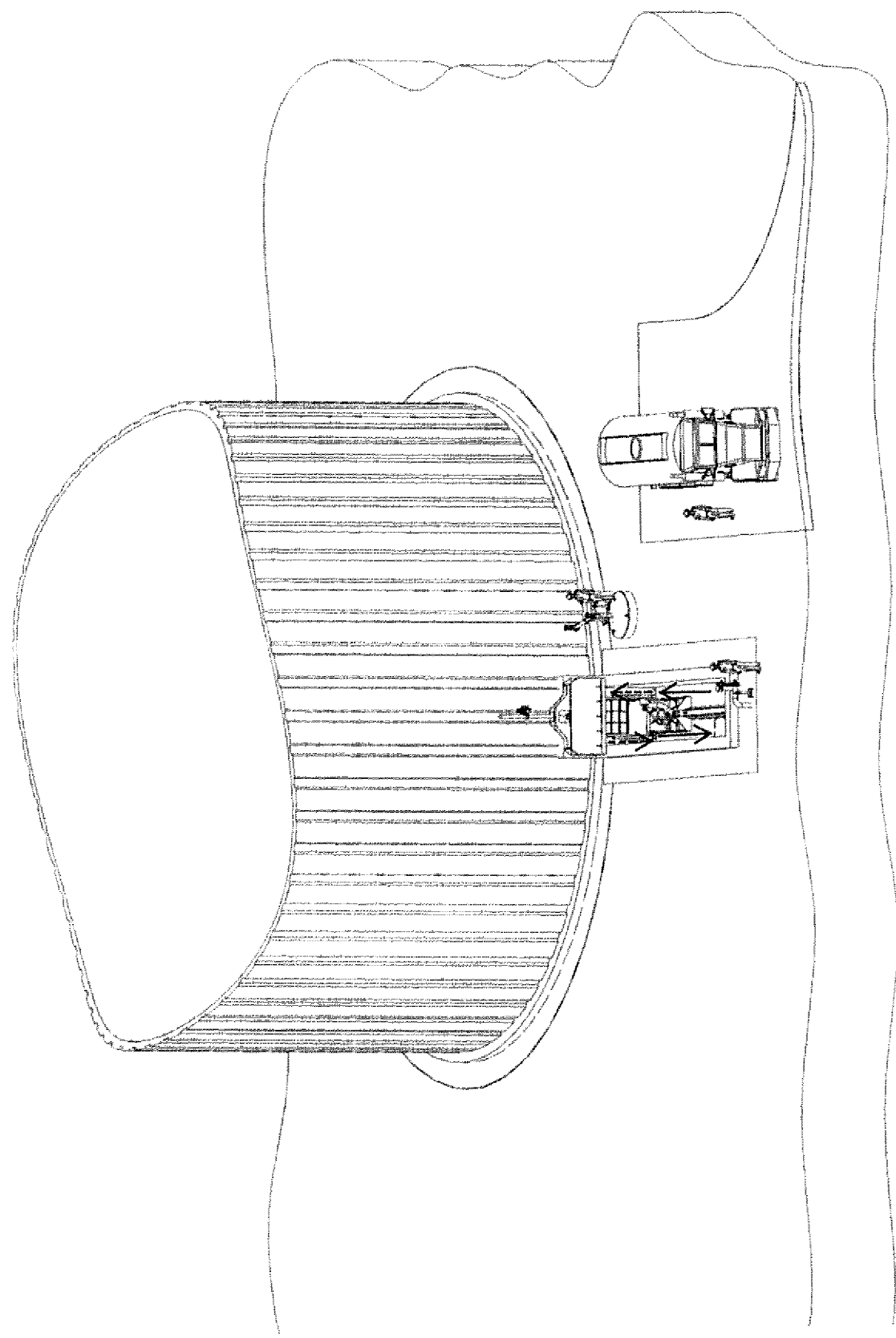

FIG. 12b. is a pictorial representation of the method of FIG. 12a.

SUMMARY

In an aspect of the invention an auger cleaned inaccessible floor system for cleaning waste from the inaccessible floor system, includes a floor, the floor including at least one longitudinal channel beneath the lowest point of the floor and extending at least half a longest dimension of the floor, the channel in fluid communication with the floor and configured to receive an auger cleaner; at least one box in fluid communication with the channel having a box interior volume, the at least one box including a lid, where the lid is removably attached to the box; a rail attached in the box interior volume for fixing a boom, the boom attaching and directing movement of the auger cleaner; a waste discharge pipe in fluid communication with the boom for disposal of waste; at least one gate complex separating the box from the channel, the gate complex including a gate; and a gate controller to move the gate complex to an open position and a closed position, wherein in the open position the gate complex provides fluid communication between the channel and the box and the auger cleaner with access to the channel of the floor from the box, and in the closed position the gate complex hinders fluid communication between the channel and the box.

In another aspect of the invention, the auger cleaned inaccessible floor further includes the auger cleaner adapted for longitudinal movement in the channel to remove waste from the channel, the auger cleaner including an auger that spins perpendicular to the channel transporting waste toward an eddy sludge pump of the auger cleaner; the eddy sludge pump in fluid communication with the auger and configured to pump the waste to a waste transfer component of the boom; wherein the auger cleaner is removably attached to the boom, and the auger cleaner is in fluid communication a waste transfer component of the boom; the boom being multi-segmented and configured to extend and retract horizontally to move the auger cleaner longitudinally in the channel, the boom including the waste transfer component that transfers waste from the auger cleaner to the waste disposal pipe, wherein the boom is removably attached to the rail of the box, and the waste transfer component and the waste disposal pipe are in fluid communication; and a hydraulic circuit to power the auger cleaner and the boom, wherein the auger cleaner is in fluid communication with the hydraulic circuit, and the boom is in fluid communication with the hydraulic circuit.

In another aspect of the invention, the auger cleaned inaccessible floor system, wherein the at least one channel is half the length of the longest dimension of the floor; and the floor is circular in shape, the floor further including a sloped segment sloped in a conical manner toward the at least one channel; a first sloped quadrant sloped toward the at least one channel and the at least one gate complex; a second sloped quadrant sloped toward the at least one channel and the at least one gate complex, wherein the sloped segment, the first sloped quadrant, and the second sloped quadrant are formed as a single unit.

In another aspect of the invention, the auger cleaned inaccessible floor system, wherein the slope of the sloped segment, the first sloped quadrant, and the second sloped quadrant is from 8 to 12 percent (length to height).

In another aspect of the invention, the auger cleaned inaccessible floor system, further comprising one channel the length of the longest dimension of the floor; the floor is rectangular in shape and sloped inward toward the channel; two gate complexes; and two boxes, wherein the two gate complexes provide fluid communication between each end of channel and the two boxes and the auger cleaner with access to the channel of the floor from the two boxes.

In another aspect of the invention, the auger cleaned inaccessible floor system further includes one channel the length of the longest dimension of the floor; the floor is rectangular in shape and sloped inward toward the one channel; a false floor configured to allow waste to pass through to the floor; and a plurality of slats, wherein the slats extend upward from the floor to support the false floor; two gate complexes; and two boxes, wherein the two gate complexes provide fluid communication between each end of channel and the two boxes and the auger cleaner with access to the channel of the floor from the two boxes.

In another aspect of the invention, the auger cleaned inaccessible floor system, further including two channels extending the length of the of the longest dimension of the floor, wherein the two channels are on opposite sides of a shortest longest dimension of the floor; the floor is rectangular in shape and sloped along substantially a center of the shortest dimension of the floor downward toward the two channels; four gate complexes; and four boxes, wherein the four gate complexes provide fluid communication between each end of the two channels corresponding to the four boxes, and the auger cleaner with access to the two channels from the four boxes.

In another aspect of the invention, the auger cleaned inaccessible floor system, wherein the slope of the floor is from 2 to 4 percent (length to height).

In another aspect of the invention, a method of cleaning an auger cleaned inaccessible floor system, the method including removing a lid from at least one box of the auger cleaned inaccessible floor system, the at least one box in fluid communication with a channel of a floor, the box having an interior volume, the box including a rail attached in the box interior volume, and a waste discharge pipe; fixing a boom to the rail and an auger cleaner in the interior volume of the box, wherein the boom is in fluid communication with the waste discharge pipe, and the boom in fluid communication with the auger; coupling a hydraulic circuit of the auger cleaned inaccessible floor system, the hydraulic circuit including an auger circuit, a pump circuit, and a boom circuit, wherein the boom is in fluid communication with the boom circuit, and the auger cleaner is in fluid communication with the auger circuit and pump circuit; sealing the lid to the box; moving a gate complex to an open position, wherein the gate complex in the open position provides fluid communication between the channel and the box; engaging the boom circuit to extend the boom horizontally to move the auger cleaner longitudinally in the channel; engaging the auger circuit and the pump circuit to remove waste from the channel for disposal away from the auger cleaned inaccessible floor system; engaging the boom circuit to retract the boom to a retracted position longitudinally retracting the auger cleaner into the box; moving the gate complex to a closed position, wherein the closed position hinders fluid communication between the channel and the box; removing the auger cleaner and the boom from the box.

In another aspect of the invention, the method of cleaning an auger cleaned inaccessible floor system, wherein the moving of the gate complex to the open position further includes equalizing the pressure of the auger cleaned inaccessible floor system when the floor is submerged.

In another aspect of the invention, the method of cleaning an auger cleaned inaccessible floor system, wherein the removing of the auger cleaner and the boom from the box further includes engaging a sump pump to remove fluid from the box.

DETAILED DESCRIPTION

Auger cleaned inaccessible floor systems to maximize operational capacity of inaccessible floors are described. The auger cleaned inaccessible floor system includes a floor having at least one channel beneath the lowest point of the floor extending horizontally at least half the length of the longest dimension of the floor and adapted for receiving an auger cleaner, at least one gate complex that provides fluid communication between the channel and at least one box and further provides access to the floor for the auger cleaner, and at least one box to deliver the auger cleaner to the channel and adapted for equalizing pressure when the inaccessible floor is under water to deliver an auger cleaner for cleaning. The auger cleaned inaccessible floor system may include a sump pump to remove waste from the at least one box and may deliver liquid back to the inaccessible floor system when the floor is submerged. As used herein waste, for example from anaerobic digestion and livestock, is considered fluid.

The auger cleaner is delivered to the channel of the inaccessible floor via the at least one gate complex and a multi-segmented horizontal boom that provides horizontal extension for longitudinal movement of the auger cleaner in the channel. Thus, the auger cleaned inaccessible floor system allows cleaning of the inaccessible floor while the inaccessible floor system is in operation increasing the yield from the inaccessible floor system. Further, the inaccessible floor system does not require a human to enter the inaccessible floor decreasing risk associated with cleaning.

Figure 1:
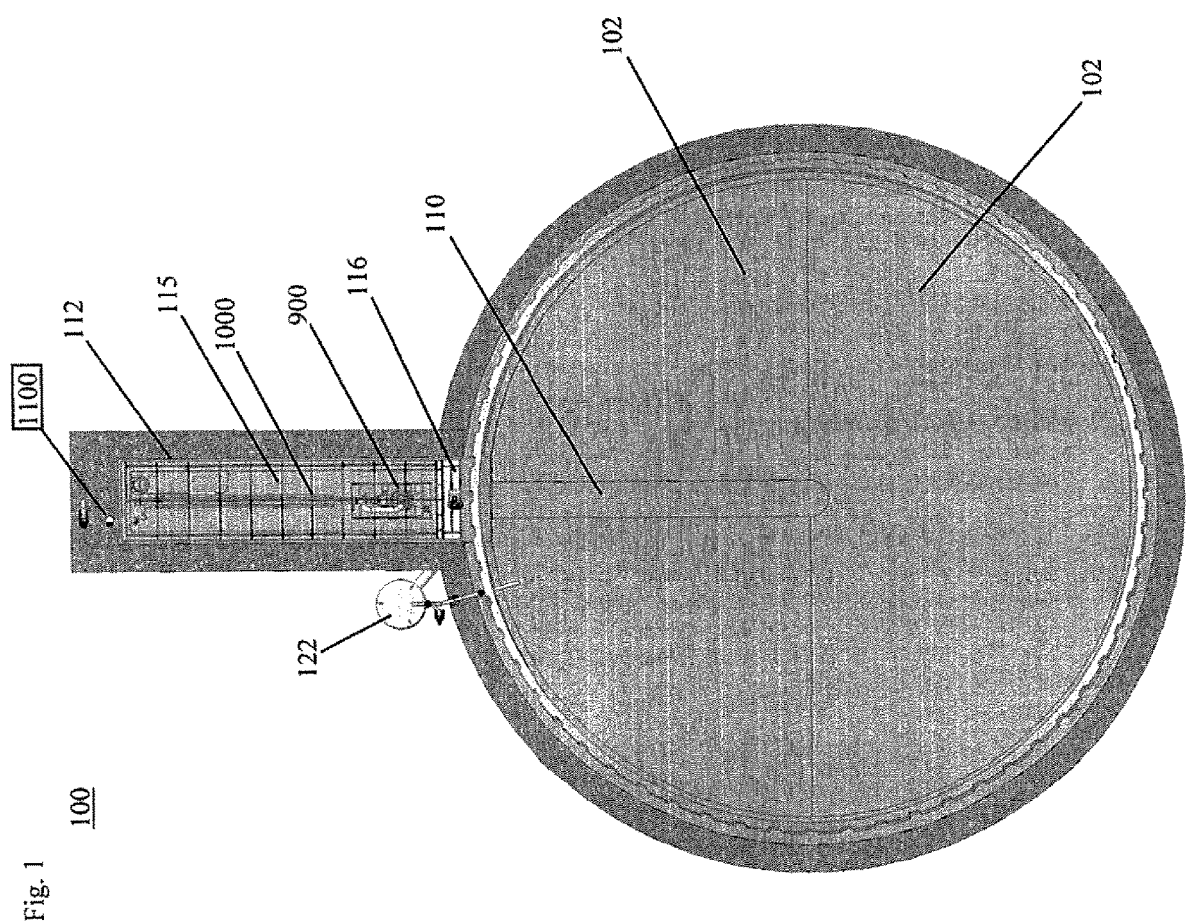
FIG. 1 is a top down view of a representation of an auger cleaned inaccessible floor system.

FIG. 1 represents a top down view of an auger cleaned inaccessible floor system 100. The auger cleaned inaccessible floor system 100 includes a floor 102, at least one gate complex 116, at least one box 112, an auger 900, a boom 1000, and a hydraulic circuit 1100. The floor 102 may be may be submerged under liquid, may be underneath a mechanical barrier, or may contain livestock, such that the floor 102 is inaccessible during use. The auger cleaned inaccessible floor system 100 may include a sump pump 122 when the floor 102 is submerged.

The floor 102 is sloped toward at least one channel 110 to efficiently deliver waste to the channel 110 (see FIGS. 5-8). The floor 102 may be of any shape compatible with waste accumulation, such as circular, rectangular, or square. The floor 102 may be made of any non-corrosive material, such as stainless steel, concrete, or metal alloys. The material of the floor 102 may further be covered with a non-corrosive material, such as corrosion resistant polymers or powders to increase the ability of waste to move to the at least one channel 110 efficiently.

The at least channel 110 of the digester floor 102 receives waste. The channel 110 is in fluid communication with the floor 102. The at least one channel 110 further receives an auger cleaner 900. The at least one channel 110 extends horizontally from the gate 119 for at least half the length of the longest dimension of the floor 102. The at least one channel 110 is below is the lowest point of the floor 102, such as from 4 to 12 inches deep. Preferably the at least one channel 110 is from 6 to 10 inches deep. Most preferably the at least one channel 110 is from 7 to 9 inches deep.

The width of the at least one channel 110 is adapted to receive the auger cleaner 900 for longitudinal movement along the channel 110, such as from 2 to 6 feet wide. Preferably the channel 110 is from 3 to 5 feet wide. Most preferably the channel 110 is from 3.5 to 4.5 feet wide. The channel 110 increases the surface area and volume for waste to accumulate in the auger cleaned inaccessible floor 100.

The at least one box 112 of the auger cleaned inaccessible floor system 100 is in fluid communication with the at least one channel 110 and delivers the auger cleaner 900 to the at least one channel 110. The box 112 having a box interior volume may further equalize liquid pressure in the auger cleaned inaccessible floor system for delivery of the auger cleaner 900 to the channel 110, when the floor 102 is submerged. The at least one box 112 is from 15 to 30 feet in length, 3 to 7 feet in width, and 3 to 7 feet in height. The at least one box 112 includes a lid 115, a rail 114 (see FIG. 2), a waste discharge pipe 121 (see FIG. 2), and hydraulic disconnects 120 (see FIG. 2).

The lid 115 (shown as transparent in FIG. 1 for illustration purposes) of the at least one box 112 seals the at least one box 112 during use of the auger 900. When the floor 102 is submerged under liquid, the at least one box 112 allows liquid to enter the box interior volume to equalize fluid pressure of the auger cleaned inaccessible floor system 100, where the liquid remains in the auger cleaned inaccessible floor system 100 during cleaning as the lid 115 seals the box 112. The lid 115 is substantially the same length and width as the box 112. The lid 115 is removably attached to the box 112 to seal the box 112, such as through bolts, screws, or combinations thereof. The lid 115 may be made of a non-corrosive material such as stainless steel, metal alloys, or the like.

Figure 3:
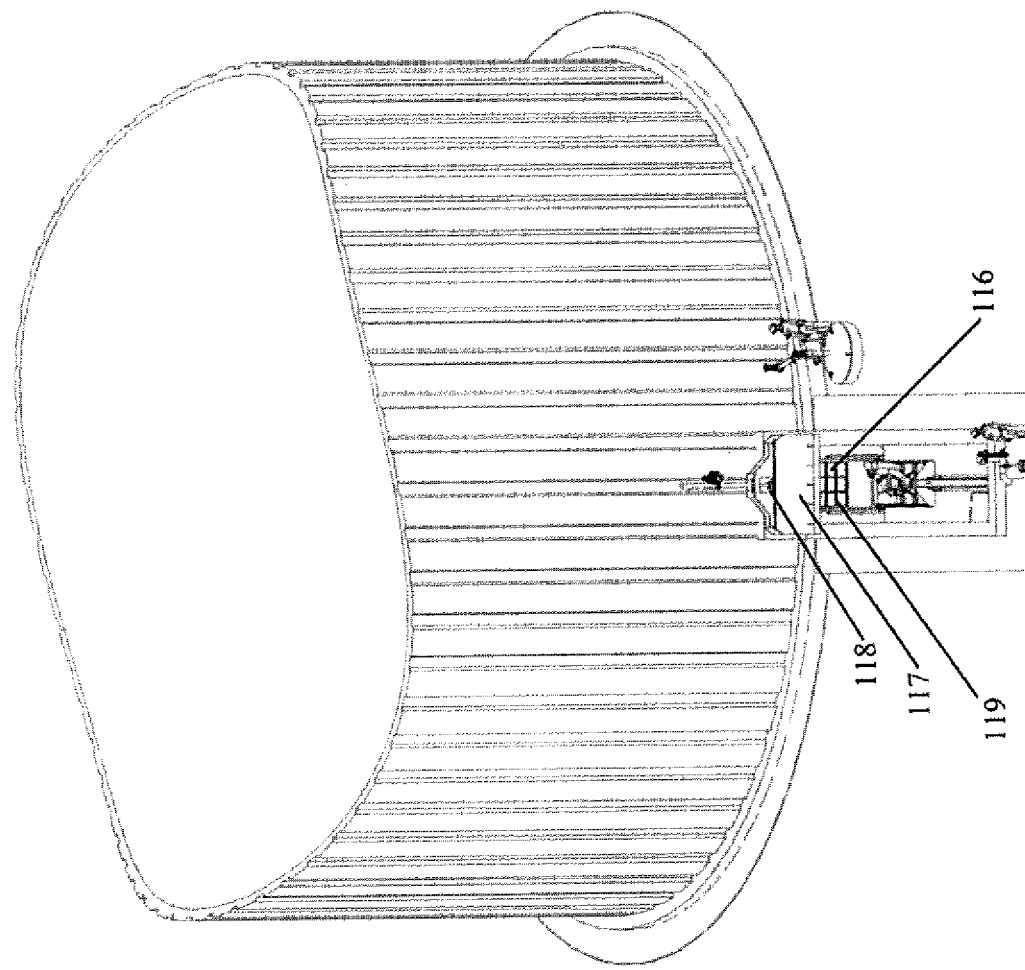
FIG. 3 is a representation of a gate complex of the auger cleaned inaccessible floor system.

The at least one gate complex 116 of the auger cleaned inaccessible floor system 100 is configured to provide the auger 900 with access to the at least one channel 110 of the floor 102, as shown in FIG. 3.

Figure 4:
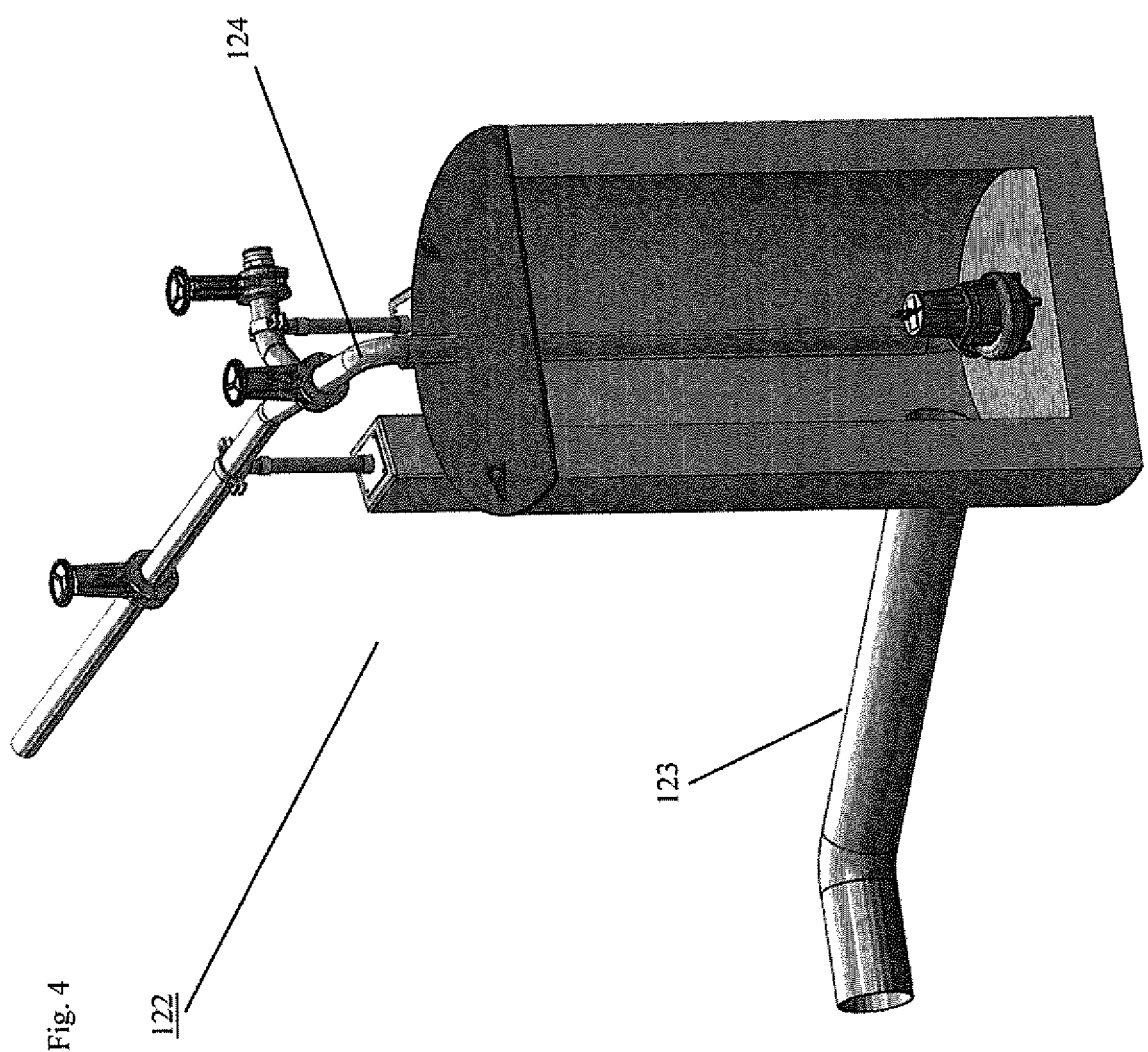
FIG. 4 is a representation of a sump pump of the auger cleaned inaccessible floor system.

The sump pump 122 of the auger cleaned digester tank 100 removes liquid digestate and water from the at least one box 112 after cleaning, as further described in FIG. 4.

Figure 2:
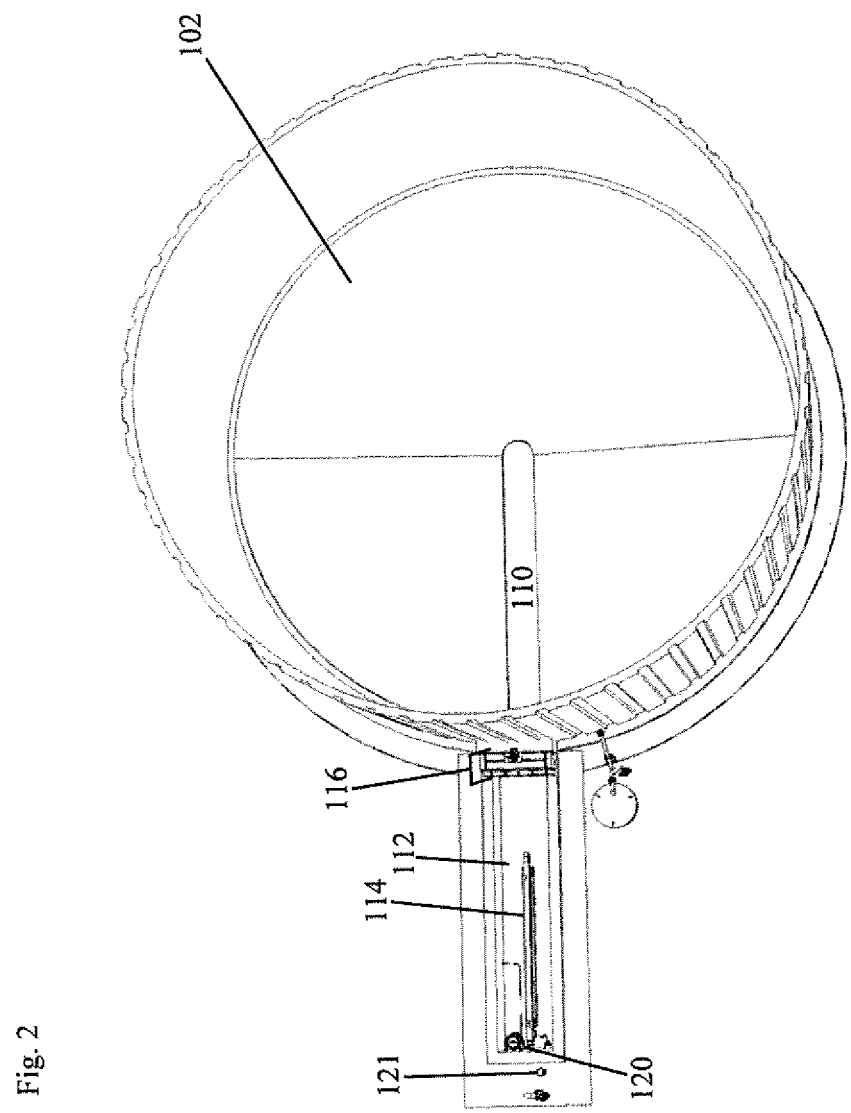
FIG. 2 is a top down view of a representation of a box of the auger cleaned inaccessible floor system.

FIG. 2 represents the at least one box 112 of the auger cleaned digester tank 100 without the auger 900. The rail 114 of the at least one box 112 is attached in the box interior volume. The rail 114 provides removable attachment for the boom 1000 to fix the boom 100, providing push points during extension and retraction of the boom 1000. The rail 114 may be an I-beam. The rail 115 may be made of any non-reactive material, such as stainless steel, metal alloys, or the like.

The waste discharge pipe 121 provides fluid communication with the boom 1000 to dispose of waste from the auger cleaned inaccessible floor 100. The waste discharge pipe 121 may include a valve to control flow of the waste, such as to a waste removal truck for disposal of the waste. The hydraulic disconnects 120 of the box 112 provide hydraulic communication between the auger cleaner 900, the boom 1000, and the hydraulic system 1100.

FIG. 3 represents the at least one gate complex 116. The at least one gate complex 116 separates the at least one box 112 from the floor 102. The at least one gate complex 116 includes a gate 119, a gate shield 117, and gate controller 118. The gate 119 of the at least one gate complex 116 separates the at least one channel 110 of the floor 102 from the at least one box 112 hindering fluid communication when in a closed position. When in an open position (as shown), the at least one gate 119 allows fluid communication between the channel 110 and the box interior volume of the box 112, and provides access to the at least one channel 110 for the auger cleaner 900. The gate controller 118 opens and closes the gate 119, such as via a single cylinder hydraulic drive motor, an electric motor, or a manual hydraulic control. The at least one gate complex 116 may include a gate shield 117 that substantially receives the gate 119 when it is open to protect it from damage. The gate shield 117 may be of any non-corrosive material such as stainless steel, metal alloys, or the like.

FIG. 4 represents the sump pump 122 of the auger cleaned digester tank 100. The sump pump is configured to remove water from the at least one box 112 upon completion of cleaning the auger cleaned digester tank 100. The sump pump 122 is located substantially underground adjacent to the auger cleaned inaccessible floor system 100 and the at least one box 112. The sump pump includes a drain 123, and a discharge line 124. The sump pump 122 is in fluid communication with the box 112 via a drain 123. The sump pump 122 delivers water from the box 112 to a water truck for disposal or back to the auger cleaned digester tank 100 via a discharge line 124.

Figure 5:
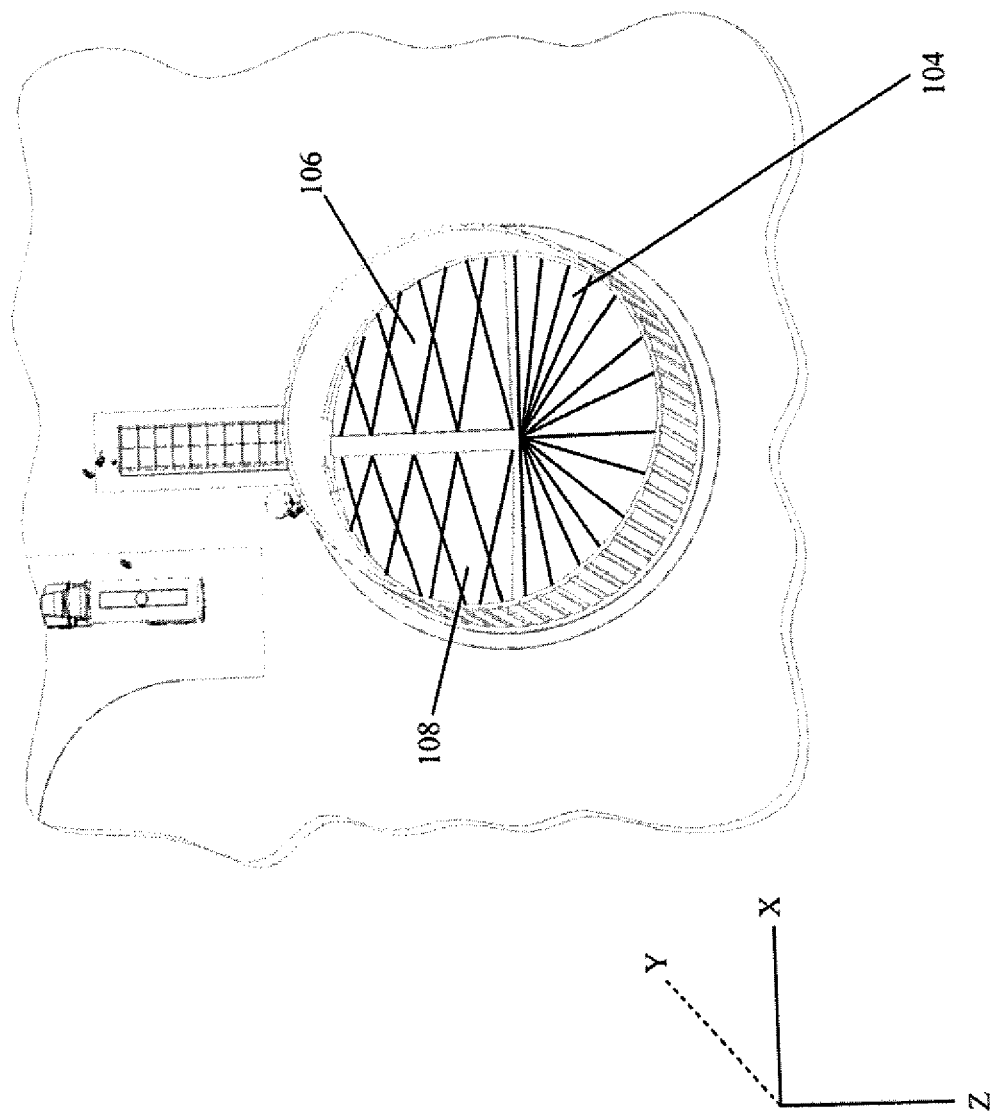
FIG. 5 is a representation of a slope of an inaccessible floor having a circular shape, where the inaccessible floor is inaccessible due to submersion under liquid.

FIG. 5 represents the slope of the floor 102 when the floor 102 is circular in shape and is submerged under liquid, such as in an anaerobic digestion tank. For example, the floor 102 may include a sloped segment 104, a first sloped quadrant 106, and a second sloped quadrant 108. The sloped segment 104 of the floor 102 is sloped to deliver waste to the at least one channel 110 distal to the at least one gate 119. The first sloped quadrant 106 is sloped to deliver waste to the at least one channel 110 proximal to the at least one gate 119. The second sloped quadrant 108 is sloped to deliver digestate to the at least one channel 110 proximal to the at least one gate 119.

The slope of the sloped segment 104 is represented by the solid black lines in the sloped segment 104 to demonstrate that the sloped segment 104 is sloped in a conical manner toward the at least one channel 110 to deliver waste to the at least one channel 110 distal to the at least one gate 119. The sloped segment 104 has a slope from 8 to 12 percent (length to height). Preferably the sloped segment 104 has a slope from 9 to 11 percent, and most preferably the sloped segment 104 has a slope of 10 percent.

The slope of the first sloped quadrant 106 is represented by the solid lines in the first sloped quadrant 106 to demonstrate that the first sloped quadrant 106 is sloped in two dimensions along the x axis and the y axis. The slope is downward both toward the at least one channel 110 and the at least one gate 119, where the lowest point of the first sloped quadrant 106 is the point nearest to the at least one gate 119. The slope of the first sloped quadrant 106 is equal to the slope of the sloped segment 104, along the line where the first sloped quadrant 106 meets the sloped segment 104. The first sloped quadrant 106 has a slope from 8 to 12 percent (length to height). Preferably the first sloped quadrant 106 has a slope from 9 to 11 percent, and most preferably the first sloped quadrant 106 has a slope of 10 percent.

The slope of the second sloped quadrant 108 is represented by the solid lines in the second sloped quadrant 108 to demonstrate that the second sloped quadrant 108 is sloped in two dimensions along the x axis and the y axis. The slope is both toward the at least one channel 110 and the at least one gate 119, where the lowest point of the second sloped quadrant 108 is the point nearest to the at least one gate 119. The slope of the second sloped quadrant 108 is equal to the slope of the sloped segment 104, along the line where the second sloped quadrant 108 meets the sloped segment 104. The second sloped quadrant 108 has a slope from 8 to 12 percent (length to height). Preferably the second sloped quadrant 108 has a slope from 9 to 11 percent, and most preferably the second sloped quadrant 108 has a slope of 10 percent. The sloped segment 104, the first sloped quadrant 106, and the second sloped quadrant 108 may be formed as a single unit, such as through poured concrete.

Figure 6:
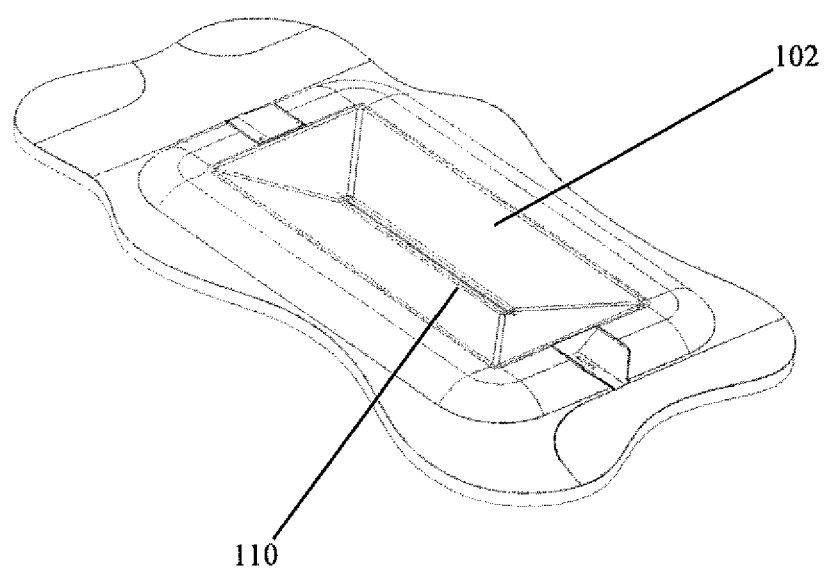
FIG. 6 is a slope of an inaccessible floor having a rectangular shape, where the inaccessible floor is inaccessible due to submersion under liquid.

FIG. 6 represents the slope of the floor 102 when the floor 102 is rectangular in shape and is submerged under liquid, such as in an anaerobic lagoon. For example, the floor 102 is sloped toward the at least one channel 110 that extends the length of the floor 102. When the length of the channel 110 extends the length of the floor 102, the auger cleaned inaccessible floor system 100 may include two gate complexes 116 and two boxes 112 to access the channel 110 from either end on the channel 110.

Figure 7:
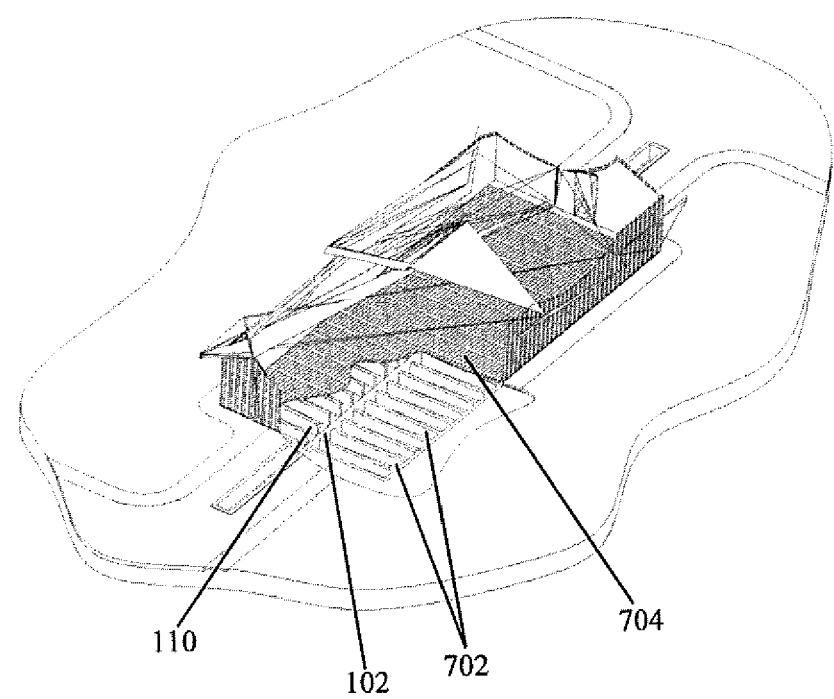
FIG. 7 is a slope of an inaccessible floor having a rectangular shape, where the inaccessible floor is inaccessible due to livestock.

FIG. 7 represents the slope of the floor 102 when the floor 102 is rectangular in shape and is inaccessible due to a mechanical barrier, such as in a hog barn. For example, the floor 102 is sloped toward the at least one channel 110 that extends the length of the floor 102. The floor 102 further includes a plurality of slats 702 and a false floor 704. The slats 702 extend vertically from the floor 102 to the false floor 704 and are spaced along the floor 102 to direct waste evenly to the at least one channel 110. The false floor 704 substantially covers the floor 102 and rests upon the slats 702. The false floor includes a plurality of slits to allow waste to pass through the false floor 704 to the floor 102 and the at least one channel 110.

Figure 8:
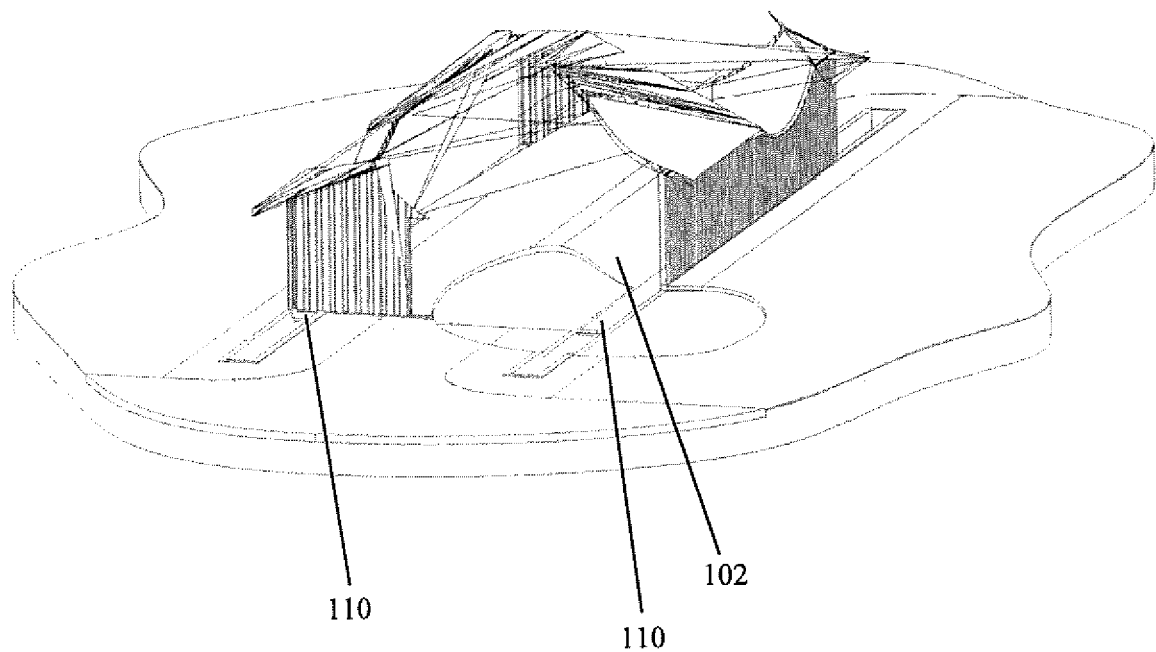
FIG. 8 is a slope of an inaccessible floor having a rectangular shape, where the inaccessible floor is inaccessible due to livestock.

FIG. 8 represents the slope of the floor 102 when the floor 102 is rectangular in shape and contains livestock during use, such as in a dairy barn. The floor 102 may include two channels 110, where the floor 102 is sloped substantially from the center of the floor 102 downward to the respective channel 110. FIG. 8 includes a representation of a cut-away to demonstrate the slope of the floor 102.

Figure 9:
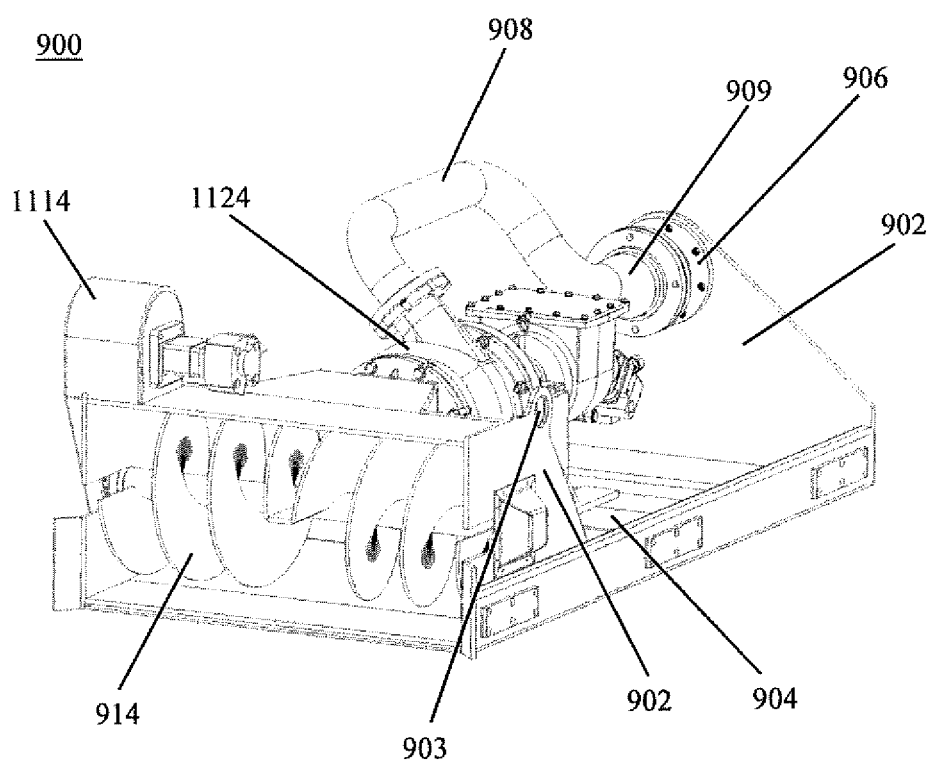
FIG. 9 represents an auger cleaner.

FIG. 9 represents an auger cleaner 900 adapted for longitudinal movement in the channel 110 for removal of waste from the floor 102. The auger cleaner 900 includes a frame 902, a waste pipe 908, a flex connection 909, an auger 914, an auger drive 1114, and an eddy sludge pump 1124. The auger cleaner 900 is in hydraulic communication with a hydraulic system 1100 for operation of the auger drive 1114 and the eddy sludge pump 1124. The auger cleaner 900 is further in fluid communication with a boom 1000 for transfer of waste for disposal.

The frame 902 is substantially the width of the channel 110, such as from 80 to 100 inches long, 40 to 60 inches wide, and from 30 to 40 inches tall. A portion of the frame 902 partially surrounds the auger 914 to increase the efficiency of waste collection by the auger 914. The frame 902 may be made of any non-corrosive material, such as stainless steel, or metal alloys.

The frame 902 may include one or more skid plates 904. The one or more skid plates 904 allow the auger 900 to move along the floor 102. The frame 902 may further include one or more boom attachments 906 for removable attachment of the auger 900 to the boom 1000. The one or more boom attachments 906 may be bolts, screws, or the like. The frame 902 may include transport attachment points 903 configured to allow for transport (lifting) of the auger cleaner 900 into and out of the box 112 prior to and after cleaning of the floor 102.

The waste pipe 908 of the auger cleaner 900 transports waste from the eddy sludge pump 1124 to the boom 1000 via the flex connection 909. The waste pipe 908 is in fluid communication with the hydraulic sludge pump 910 and the flex connection 909. The waste pipe 908 may be made of any non-corrosive material, such as stainless steel or metal alloys. The waste pipe may have a diameter from 3 to 5 inches.

The flex connection 909 provides flexible attachment of the auger cleaner 900 to the boom 1000. The flex connection 909 allows vertical and horizontal movement of the auger cleaner 900 during cleaning due to encountering irregularities (e.g. waste in the channel 110) without applying undue torque on the attachment point 906.

The auger 914 of the auger cleaner 900 disturbs waste on the floor 102 by spinning perpendicular to the width of the channel transporting the waste toward the center of the auger 914, where the eddy sludge pump 1124 pumps the waste to the waste pipe 908. The auger is in mechanical communication with the frame 902 and is in hydraulic communication with the auger drive 1114 of the hydraulic system 1000. The auger 914 is substantially the width of the frame 902. The auger is from 12 to 24 inches in height. The auger 902 is made of a non-corrosive material, such as stainless steel, or metal alloys.

FIG. 10a represents a multi-segmented boom 1000 in a retracted position. The boom 1000 provides longitudinal extension and retraction of the auger cleaner 900 within the channel 110 and provides for transfer of waste from the auger cleaner 900 for final disposal away from the auger cleaned inaccessible floor system 100. The boom 1000 includes a boom extender 1002, a waste transfer component 1004, a rail attachment 1006, an auger cleaner attachment 1008, and a waste removal attachment 1010. The boom extender 1002 is multi-segmented and extends and retracts the boom 1000. The boom extender 1002 is in hydraulic communication with the hydraulic circuit 1100. The waste transfer component 1004 is multi-segmented and is in fluid communication with the auger 900 for transfer of waste for disposal. In the retracted position the multi-segments of the boom extender 1002 and waster transfer component 1004 are compact.

The rail attachment 1006 of the boom 1000 provides removable attachment of the boom 1000 to the rail 114 of the box 112, such as through bolts, screws, or the like. The auger attachment 1008 provides removable attachment of the boom 1000 to the auger cleaner 900, such as through bolts, screws, or the like. The waste removal attachment 1010 provides removable attachment of the boom 1000 to the waste discharge pipe 121 and provides fluid communication of the waste transfer component 1004 to the waste discharge pipe 121 for final transfer and disposal of waste away from the auger cleaned inaccessible floor, such as to a truck equipped to transfer the waste.

FIG. 10b represents the boom in an extended position. In the extended position the multi-segments of the boom extender 1002 and the waste removal component 1004 are extended.

FIG. 11 represents the hydraulic system 1100 of the auger cleaned inaccessible floor system 100. The hydraulic system 1100 powers the auger cleaner 900 to remove waste from the floor 102 and powers the boom to extend and retract the auger cleaner 900. The hydraulic system 1100 includes an auger circuit 1110, a pump circuit 1120, a boom circuit 1130, and a winch circuit 1140.

The auger circuit 1110 is configured to power the auger cleaner 900. The auger circuit 1110 includes a motor 1102, an auger pump 1112, and an auger drive 1114. The motor 1102, the auger pump 1112 and the auger drive 1114 are in fluid communication, where the motor delivers power to the auger pump 1112, and the auger pump 1112 provides hydraulic power to the auger drive 1114. The auger drive 1114 powers (spins) the auger 914 of the auger cleaner 900. The auger drive 1114 may be low speed (up to 310 revolutions per minute), high torque hydraulic drive (up to 1700 pounds/inch), such as an Eaton 6000 series motor with displacement of 735 cubic centimeters per revolution.

The pump hydraulic circuit 1120 of the hydraulic system 1100 is configured to power the eddy sludge pump 1124. The pump hydraulic circuit includes the motor 1102, a sludge pump 1122, and the eddy sludge pump 1124. The motor 1102, the sludge pump 1122, and the eddy sludge pump 1124 are in fluid communication. The motor 1102 powers the sludge pump 1122 to provide hydraulic power to the eddy sludge pump 1124. The eddy sludge pump 1124 pumps waste from the auger 914 through the waste line 908 and the waste transfer component 1004 for disposal of the waste. The eddy pump 1124 is adapted for pumping waste with a high concentration of solids to liquid (40% to 70%) and is adapted for operation in both submerged and atmospheric conditions. The eddy pump has a flow rate from 250 to 1200 gallons per minute, a suction size of 6 inches, a discharge size of 4 inches, and has a maximum speed of 1800 revolutions per minutes, such as a 4 inch HD 4000 Eddy Pump.

The boom circuit 1130 of the hydraulic system 1100 is configured to extend and retract the boom 1000. The boom circuit includes the motor 1102, a boom pump 1132, and a boom cylinder 1134. The motor 1102, the boom pump 1132, and the boom cylinder 1134 are in fluid communication. The motor 1102 powers the boom pump 1132 to deliver hydraulic power to the boom cylinder 1134. The boom cylinder 1134 is a double acting cylinder to extend the boom 1000 to the extended position and retract the boom 1000 to the retracted position.

The hydraulic system 1100 may contain a winch circuit 1140 configured to retract the boom 1000 in the event of a failure of the boom circuit 1130. The winch circuit 1140 includes the motor 1102, a winch pump 1142, and a winch 1144. The motor 1102, the winch pump 1142, and the winch 1144 are in fluid communication. The motor 1102 powers the winch pump 1142 to deliver hydraulic power to the winch 1144. The winch has pulling capacity of up to 25,000 pounds and retracts the boom 1000 in the case of a failure of the boom circuit 1130.

FIG. 12a. represents a method of cleaning the auger cleaned inaccessible floor system 100. In 1201, the lid 115 of the box 112 is removed. In 1202, the boom 1000 and the auger cleaner 900 are fixed in the interior volume of the box 112. The fixing includes removably attaching the boom 1000 to the rail 114. The boom is further removably attached to the discharge pipe 121 via the waste removal attachment 1010. The fixing further includes, placing the auger cleaner 900 in the box 112 and removably attaching the auger cleaner 900 to the boom 1000 via the boom attachments 906 and the auger cleaner attachment 1008. The fixing further includes removably connecting the winch 1144 to the auger cleaner 900.

In 1203, the hydraulic circuit 1100 that includes the auger circuit 1120, the pump circuit 1110, the boom circuit 1130, and the winch circuit 1140 is coupled. The hydraulic disconnects 120 couple the auger drive 1124, the eddy sludge pump 1114, the winch 1144, and the boom cylinder 1134 to the motor 1102, the auger pump 1112, the sludge pump 1122, the boom pump 1132, and the winch pump 1142, respectively. The motor 1102, the auger pump 1112, the sludge pump 1122, the boom pump 1132, and the winch pump 1142 may be on a truck for transport to and from the auger cleaned inaccessible floor system 100.

In 1204 the box 112 is sealed by removably attaching the lid 115 to the box 112. In 1205, the gate complex 116 is moved to an open position by engaging the gate controller 118. Once the gate complex 116 is in the open position, the box 112 may fill with liquid when the floor 102 is submerged and pressure inside the auger cleaned inaccessible floor system 100 will equalize.

In 1206, the boom circuit 1130 is engaged to extend horizontally, where the auger cleaner 900 moves longitudinally in the channel 110. In 1207, simultaneously or nearly simultaneously with 1206, the auger cleaner is engaged; where the auger 914 and eddy sludge pump 1124 are engaged to remove waste from the channel 110 of the floor 102. Waste travels from the eddy sludge pump 1124 to the waste pipe 908, to the flex connection 909, to the waste transfer component 1004 of the boom 1000, to the waste discharge pipe 121 for final disposal away from the auger cleaned inaccessible floor system 100.

In 1208, the boom circuit 1130 is engaged to retract to the retracted position, where the auger cleaner 900 is retracted longitudinally in the channel 110 back into the box 112. In 1209, the gate complex 116 is moved to a closed position by engaging the gate controller 118.

In 1210, the auger cleaner 900 and boom 1000 are removed from the box 112. When the floor is submerged the removal of the auger cleaner 900 and boom 1000 may further include engaging the sump pump 122 to remove liquid from the box 112. Removing the auger cleaner 900 and the boom 1000 includes removing lid 115, and disconnecting the hydraulic circuit 1100 via the hydraulic disconnects 120. Finally, the auger cleaner 900 and boom 1000 are removed from the box 112, and the lid 115 is removable fixed to the box 112.

FIG. 12b. is a pictorial representation of the method 1200 to illustrate the steps 1205, 1206, 1207, 1208, and 1209. The lid 115 is shown in a transparent manner for illustration purposes.

The invention claimed is:

1. An auger cleaned inaccessible floor system for cleaning waste from the inaccessible floor, comprising:
   a floor, the floor including
      at least one longitudinal channel beneath the lowest point of the floor and extending at least half a longest dimension of the floor, the channel in fluid communication with the floor and configured to receive an auger cleaner;
   at least one box in fluid communication with the channel having a box interior volume,
   the at least one box including
      a lid, where the lid is removably attached to the box;
      a rail attached in the box interior volume for fixing a boom, the boom attaching and directing movement of the auger cleaner;
      a waste discharge pipe in fluid communication with the boom for disposal of waste;
   at least one gate complex separating the box from the channel, the gate complex including
      a gate; and
      a gate controller to move the gate complex to an open position and a closed position, wherein
         in the open position the gate complex provides
            fluid communication between the channel and the box and
            the auger cleaner with access to the channel of the floor from the box, and
         in the closed position the gate complex hinders fluid communication between the channel and the box.

2. The system of claim 1, further comprising
the auger cleaner adapted for longitudinal movement in the channel to remove waste from the channel, the auger cleaner including
   an auger that spins perpendicular to the channel transporting waste toward an eddy sludge pump of the auger cleaner;
   the eddy sludge pump in fluid communication with the auger and configured to pump the waste to a waste transfer component of the boom; wherein
      the auger cleaner is removably attached to the boom, and
      the auger cleaner is in fluid communication with a waste transfer component of the boom;
   the boom being multi-segmented and configured to extend and retract horizontally to move the auger cleaner longitudinally in the channel, the boom including
      the waste transfer component that transfers waste from the auger cleaner to the waste disposal pipe, wherein
         the boom is removably attached to the rail of the box, and
         the waste transfer component and the waste disposal pipe are in fluid communication; and
a hydraulic circuit to power the auger cleaner and the boom, wherein
   the auger cleaner is in fluid communication with the hydraulic circuit, and
   the boom is in fluid communication with the hydraulic circuit.

3. The system of claim 1, wherein
the at least one channel is half the length of the longest dimension of the floor; and
the floor is circular in shape, the floor further including
   a sloped segment sloped in a conical manner toward the at least one channel;
   a first sloped quadrant sloped toward the at least one channel and the at least one gate complex;
   a second sloped quadrant sloped toward the at least one channel and the at least one gate complex, wherein
      the sloped segment, the first sloped quadrant, and the second sloped quadrant are formed as a single unit.

4. The system of claim 3, wherein
the slope of the sloped segment, the first sloped quadrant, and the second sloped quadrant is from 8 to 12 percent (length to height).

5. The system of claim 1, further comprising
one channel the length of the longest dimension of the floor;
the floor is rectangular in shape and sloped inward toward the channel;
two gate complexes; and
two boxes, wherein
   the two gate complexes provide
      fluid communication between each end of channel and the two boxes and
      the auger cleaner with access to the channel of the floor from the two boxes.

6. The system of claim 1, further comprising
one channel the length of the longest dimension of the floor;
the floor is rectangular in shape and sloped inward toward the one channel;
a false floor configured to allow waste to pass through to the floor; and
a plurality of slats, wherein
   the slats extend upward from the floor to support the false floor;
two gate complexes; and
two boxes, wherein
   the two gate complexes provide
      fluid communication between each end of channel and the two boxes and
      the auger cleaner with access to the channel of the floor from the two boxes.

7. The system of claim 1, further comprising
two channels extending the length of the of the longest dimension of the floor, wherein
   the two channels are on opposite sides of a shortest longest dimension of the floor;
the floor is rectangular in shape and sloped along substantially a center of the shortest dimension of the floor downward toward the two channels;
four gate complexes;
and four boxes, wherein
   the four gate complexes provide fluid communication between each end of the two channels corresponding to the four boxes, and
the auger cleaner with access to the two channels from the four boxes.

8. The system of claim 7, wherein
the slope of the floor is from 2 to 4 percent (length to height).

\* \* \* \* \*

UNITED STATES PATENT AND TRADEMARK OFFICE
CERTIFICATE OF CORRECTION

| | |
|---|---|
| PATENT NO. | : 11,298,731 B2 |
| APPLICATION NO. | : 16/783629 |
| DATED | : April 12, 2022 |
| INVENTOR(S) | : Jared Burma |

It is certified that error appears in the above-identified patent and that said Letters Patent is hereby corrected as shown below:

In the Claims

Claim 1 should read as follows:
1. An auger cleaned inaccessible floor system for cleaning waste from the inaccessible floor, comprising: a floor, the floor including at least one longitudinal channel beneath the lowest point of the floor and extending at least half a longest dimension of the floor, the channel in fluid communication with the floor and configured to receive an auger cleaner; at least one box in fluid communication with the channel having a box interior volume, the at least one box including a lid, where the lid is removably attached to the box; a rail attached in the box interior volume for fixing a boom, the boom attaching to and directing movement of the auger cleaner; a waste discharge pipe in fluid communication with the boom for disposal of waste; at least one gate complex separating the box from the channel, the gate complex including a gate; and
a gate controller to move the gate complex to an open position and a closed position, wherein in the open position the gate complex provides fluid communication between the channel and the box and the auger cleaner with access to the channel of the floor from the box, and in the closed position the gate complex hinders fluid communication between the channel and the box.
Claim 2 should read as follows:
2. The system of claim 1, further comprising the auger cleaner adapted for longitudinal movement in the channel to remove waste from the channel, the auger cleaner including an auger that spins perpendicular to the channel transporting waste toward an eddy sludge pump of the auger cleaner; the eddy sludge pump in fluid communication with the auger and configured to pump the waste to a waste transfer component of the boom; wherein the auger cleaner is removably attached to the boom, and the auger cleaner is in fluid communication with the waste transfer component of the boom; the boom being multi-segmented and configured to extend and retract horizontally to move the auger cleaner longitudinally in the channel, the boom including the waste transfer component that transfers waste from the auger cleaner to the waste discharge pipe, wherein the boom is removably attached to the rail of the box, and the waste transfer component and the waste discharge pipe are in fluid communication; and a hydraulic circuit to power the auger cleaner and the boom, wherein the auger cleaner is in fluid communication with the hydraulic circuit, and the boom is in fluid communication with the hydraulic circuit.

Signed and Sealed this
Ninth Day of August, 2022

*Katherine Kelly Vidal*

Katherine Kelly Vidal
*Director of the United States Patent and Trademark Office*

CERTIFICATE OF CORRECTION (continued)
U.S. Pat. No. 11,298,731 B2

Claim 5 should read as follows:

5. The system of claim 1, further comprising one channel the length of the longest dimension of the floor; the floor is rectangular in shape and sloped inward toward the channel; two gate complexes; and two boxes, wherein the two gate complexes provide fluid communication between each end of the channel and the two boxes and the auger cleaner with access to the channel of the floor from the two boxes.

Claim 6 should read as follows:

6. The system of claim 1, further comprising one channel the length of the longest dimension of the floor; the floor is rectangular in shape and sloped inward toward the one channel; a false floor configured to allow waste to pass through to the floor; and a plurality of slats, wherein the slats extend upward from the floor to support the false floor; two gate complexes; and two boxes, wherein the two gate complexes provide fluid communication between each end of the channel and the two boxes and the auger cleaner with access to the channel of the floor from the two boxes.

Claim 7 should read as follows:

7. The system of claim 1, further comprising two channels extending the length of the longest dimension of the floor, wherein the two channels are on opposite sides of a shortest dimension of the floor; the floor is rectangular in shape and sloped along substantially a center of the shortest dimension of the floor downward toward the two channels; four gate complexes; and four boxes, wherein the four gate complexes provide fluid communication between each end of the two channels corresponding to the four boxes, and the auger cleaner with access to the two channels from the four boxes.